(12) United States Patent
Wang et al.

(10) Patent No.: US 12,675,218 B2
(45) Date of Patent: Jul. 7, 2026

(54) CONTROLLERS, TEST SYSTEMS, MEMORY SYSTEMS, DATA PROCESSING METHODS AND DEVICES

(71) Applicant: YANGTZE MEMORY TECHNOLOGIES CO., LTD., Wuhan (CN)

(72) Inventors: Zhanbo Wang, Wuhan (CN); Yue Ma, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/911,022

(22) Filed: Oct. 9, 2024

(65) Prior Publication Data

US 2025/0377786 A1 Dec. 11, 2025

(30) Foreign Application Priority Data

Jun. 5, 2024 (CN) .......................... 202410726236.7

(51) Int. Cl.
*G06F 3/06* (2006.01)

(52) U.S. Cl.
CPC .......... *G06F 3/0608* (2013.01); *G06F 3/0638* (2013.01); *G06F 3/0679* (2013.01)

(58) Field of Classification Search
CPC ................. G06F 3/0608; G06F 3/0638; G06F 2212/401; G06F 3/0679; G06F 2212/1044

USPC ................................................. 711/103, 170
See application file for complete search history.

(56) References Cited

U.S. PATENT DOCUMENTS

| | | | | |
|---|---|---|---|---|
| 2011/0196827 A1* | 8/2011 | Zunger | .................. | G06F 16/27 |
| | | | | 707/622 |
| 2017/0125070 A1* | 5/2017 | Hadar | .................... | G11C 5/148 |
| 2019/0227878 A1* | 7/2019 | Agarwal | ................. | G06F 8/658 |
| 2020/0250049 A1* | 8/2020 | Lee | ..................... | G06F 11/1471 |
| 2021/0397350 A1* | 12/2021 | Luo | ....................... | G06F 3/0608 |
| 2024/0028510 A1* | 1/2024 | Arelakis | ............. | H03M 7/6029 |

\* cited by examiner

*Primary Examiner* — Hashem Farrokh
(74) *Attorney, Agent, or Firm* — Conley Rose, P.C.

(57) ABSTRACT

The present disclosure provides a controller. The controller is configured to: receive data to be compressed which includes multiple full data. Compressed data is output based on the data to be compressed. The compressed data includes at least first compressed data and second compressed data. The first compressed data and the second compressed data are obtained based on first data to be compressed and second data to be compressed in the data to be compressed respectively. The first compressed data includes a first base value and an incremental value of at least one of full data in the first data to be compressed relative to the first base value. The second compressed data includes a second base value and an incremental value of at least one of full data in the second data to be compressed relative to the second base value.

20 Claims, 8 Drawing Sheets

RECEIVE DATA TO BE COMPRESSED    ~ S100

PERFORM DIFFERENTIAL ENCODING ON THE DATA TO BE COMPRESSED AND OUTPUT THE COMPRESSED DATA    ~ S200

RECEIVE DATA TO BE COMPRESSED    ～ S100

PERFORM DIFFERENTIAL ENCODING ON THE DATA TO BE COMPRESSED AND OUTPUT THE COMPRESSED DATA    ～ S200

1200A

CONTROLLER    1220A

DATA COLLECTOR    1210A 1200A    1220A

CONTROLLER

1210A

DATA COLLECTOR     1300A    DEVICE TO BE TESTED

1

CONTROLLERS, TEST SYSTEMS, MEMORY SYSTEMS, DATA PROCESSING METHODS AND DEVICES

CROSS-REFERENCE TO RELATED APPLICATIONS

The present application claims priority to Chinese Patent Application No. 2024107262367, which was filed Jun. 5, 2024, and is hereby incorporated herein by reference in its entirety.

TECHNICAL FIELD

The present application relates to the field of data processing technology, and more particularly to a controller, a test system, a memory system, a data processing method and a device.

BACKGROUND

During periods for the design, manufacturing, and application verification of product, product performance may be accurately evaluated through measuring characteristic parameters of products under different working conditions by sensors, and then targeted optimization may be performed. However, when test data is recorded with sensors, storing the entire of high-speed, high-precision test data of the sensor will occupy a large amount of memory space and transmission bandwidth.

SUMMARY

Examples of the present disclosure provide a controller, a test system, a memory system, a data processing method and a device.

In a first aspect, an example of the present disclosure provides a controller, the controller is configured to: receive data to be compressed, the data to be compressed includes multiple full data. Compressed data is output based on the data to be compressed. The compressed data includes at least first compressed data and second compressed data. The first compressed data is obtained based on first data to be compressed in the data to be compressed, and the first compressed data includes a first base value and an incremental value of at least one of full data in the first data to be compressed relative to the first base value. The increment value in the first compressed data falls within a preset range of increment values. The second compressed data is obtained based on second data to be compressed in the data to be compressed, and the second compressed data includes a second base value and an incremental value of at least one of full data in the second data to be compressed relative to the second base value. The increment value in the second compressed data falls within the preset range of increment values. The first base value is different from the second base value.

In some implementations, the first base value is one of full data in the first data to be compressed. The second base value is one of full data in the second data to be compressed.

In some implementations, the first base value is the average of the maximum and minimum of all full data in the first data to be compressed. The second base value is the average of the maximum and minimum of all full data in the second data to be compressed.

In some implementations, the difference between the first base value and the second base value does not fall within the preset range of increment values.

In some implementations, the first compressed data further includes a first identifier, and the first identifier is to distinguish the first base value with the incremental value relative to the first base value in the first compressed data. The second compressed data further includes a second identifier, and the second identifier is to distinguish the second base value with the incremental value relative to the second base value in the second compressed data.

In some implementations, the first identifier is further to indicate the number of incremental values in the first compressed data. The second identifier is further to indicate the number of incremental values in the second compressed data.

In some implementations, the first compressed data further includes a third identifier and a fourth identifier, and the third identifier is to indicate the storage location of the first base value. The fourth identifier is to indicate the storage location of the incremental value in the first compressed data. The second compressed data further includes a fifth identifier and a sixth identifier, and the fifth identifier is to indicate the storage location of the second base value. The sixth identifier is to indicate the storage location of the incremental value in the second compressed data.

In some implementations, outputting compressed data based on the data to be compressed includes: obtaining multiple groups of compressed data based on the data to be compressed. Different groups of the compressed data in the multiple groups of compressed data are obtained based on different preset ranges of increment values. Target compressed data is output according to the multiple groups of compressed data. The target compressed data is the compressed data occupying the smallest storage space among the multiple compressed data.

In a second aspect, an example of the present disclosure provides a test system, the test system including a data collector and a controller. The data collector is coupled with the controller. The data collector is configured to: obtain test data of the device to be tested. The test data includes multiple full data. The controller is configured to compress the test data and output the compressed data. The compressed data includes at least first compressed data and second compressed data. The first compressed data is obtained based on first test data in the test data, and the first compressed data includes a first base value and an incremental value of at least one of full data in the first test data relative to the first base value. The increment value in the first compressed data falls within a preset range of increment values. The second compressed data is obtained based on second test data in the test data, and the second compressed data includes a second base value and an incremental value of at least one of full data in the second test data relative to the second base value. The increment value in the second compressed data falls within the preset range of increment values. The first base value is different from the second base value.

In some implementations, the test data includes at least voltage data and current data of the device to be tested.

In a third aspect, an example of the present disclosure provides a memory system, the memory system includes a controller and a memory, and the controller is coupled with the memory. The controller is configured to: receive data to be compressed, the data to be compressed includes multiple full data. Compressed data is output based on the data to be compressed. The compressed data includes at least first compressed data and second compressed data. The first compressed data is obtained based on first data to be compressed in the data to be compressed, and the first compressed data includes a first base value and an incremental value of at least one of full data in the first data to be compressed relative to the first base value. The increment value in the first compressed data falls within a preset range of increment values. The second compressed data is obtained based on second data to be compressed in the data to be compressed, and the second compressed data includes a second base value and an incremental value of at least one of the full amounts data in the second data to be compressed relative to the second base value. The increment value in the second compressed data falls within the preset range of increment values. The first base value is different from the second base value. The compressed data is stored in the memory.

In a fourth aspect, an example of the present disclosure provides a data processing method, including receiving data to be compressed, wherein the data to be compressed includes multiple full data. Compressed data is output based on the data to be compressed. The compressed data includes at least first compressed data and second compressed data. The first compressed data is obtained based on first data to be compressed in the data to be compressed, and the first compressed data includes a first base value and an incremental value of at least one of full data in the first data to be compressed relative to the first base value. The increment value in the first compressed data falls within a preset range of increment values. The second compressed data is obtained based on second data to be compressed in the data to be compressed, and the second compressed data includes a second base value and an incremental value of at least one of full data in the second data to be compressed relative to the second base value. The increment value in the second compressed data falls within the preset range of increment values. The first base value is different from the second base value.

In some implementations, the first base value is one of full data in the first data to be compressed. The second base value is one of full data in the second data to be compressed.

In some implementations, the first base value is the average of the maximum and minimum of all full data in the first data to be compressed. The second base value is the average of the maximum and minimum of all full data in the second data to be compressed.

In some implementations, the difference between the first base value and the second base value does not fall within the preset range of increment values.

In some implementations, the first compressed data further includes a first identifier, and the first identifier is to distinguish the first base value with the incremental value relative to the first base value in the first compressed data. The second compressed data further includes a second identifier, and the second identifier is to distinguish the second base value with the incremental value relative to the second base value in the second compressed data.

In some implementations, the first identifier is further to indicate the number of incremental values in the first compressed data. The second identifier is further to indicate the number of incremental values in the second compressed data.

In some implementations, the first compressed data further includes a third identifier and a fourth identifier, and the third identifier is to indicate the storage location of the first base value. The fourth identifier is to indicate the storage location of the incremental value in the first compressed data. The second compressed data further includes a fifth identifier and a sixth identifier, and the fifth identifier is to indicate the storage location of the second base value. The sixth identifier is to indicate the storage location of the incremental value in the second compressed data.

In some implementations, outputting compressed data based on the data to be compressed includes: obtaining multiple groups of compressed data based on the data to be compressed. Different groups of the compressed data in the multiple groups of compressed data are obtained based on different preset ranges of increment values. Target compressed data is output according to the multiple groups of compressed data. The target compressed data is the compressed data occupying the smallest storage space among the multiple compressed data.

In a fifth aspect, an example of the present disclosure provides an electronic device, including a host and a test system, wherein the host is coupled with the test system. The test system is configured to: obtain test data of the device to be tested. The test data includes multiple full data. The test data is compressed and the compressed data is output to the host. The compressed data includes at least first compressed data and second compressed data. The first compressed data is obtained based on first test data in the test data, and the first compressed data includes a first base value and an incremental value of at least one of full data in the first test data relative to the first base value. The increment value in the first compressed data falls within a preset range of increment values. The second compressed data is obtained based on second test data in the test data, and the second compressed data includes a second base value and an incremental value of at least one of full data in the second test data relative to the second base value. The increment value in the second compressed data falls within the preset range of increment values. The first base value is different from the second base value. The host is configured to obtain decompressed data according to the compressed data.

In a sixth aspect, an example of the present disclosure provides an electronic device, including a host and a memory system, wherein the host is coupled with the memory system. The memory system includes a controller and a memory, wherein the controller is coupled with the memory. The controller is configured to: receive data to be compressed from the host, the data to be compressed includes multiple full data. Compressed data is output based on the data to be compressed. The compressed data includes at least first compressed data and second compressed data. The first compressed data is obtained based on first data to be compressed in the data to be compressed, and the first compressed data includes a first base value and an incremental value of at least one of full data in the first data to be compressed relative to the first base value. The increment value in the first compressed data falls within a preset range of increment values. The second compressed data is obtained based on second data to be compressed in the data to be compressed, and the second compressed data includes a second base value and an incremental value of at least one of full data in the second data to be compressed relative to the second base value. The increment value in the second compressed data falls within the preset range of increment values. The first base value is different from the second base value. The compressed data is stored in the memory.

In a seventh aspect, an example of the present disclosure provides a computer-readable storage medium, which includes instructions. The instructions, when run on the processor, cause the processor to perform any data processing method of the fourth aspect . . .

BRIEF DESCRIPTION OF THE DRAWINGS

In order to illustrate the technical solutions in the present disclosure more clearly, the following will briefly introduce the accompanying drawings used in some examples of the present disclosure, apparently, the accompanying drawings in the following description are only drawings of some examples of the present disclosure, and those skilled in the art can also obtain other drawings according to these accompanying drawings. In addition, the accompanying drawings in the following description may be regarded as schematic diagrams, and are not limitations on the actual size of the product involved in the examples of the present disclosure, actual flows of methods, actual timings of signals, etc.

DETAILED DESCRIPTION

Figure 1:
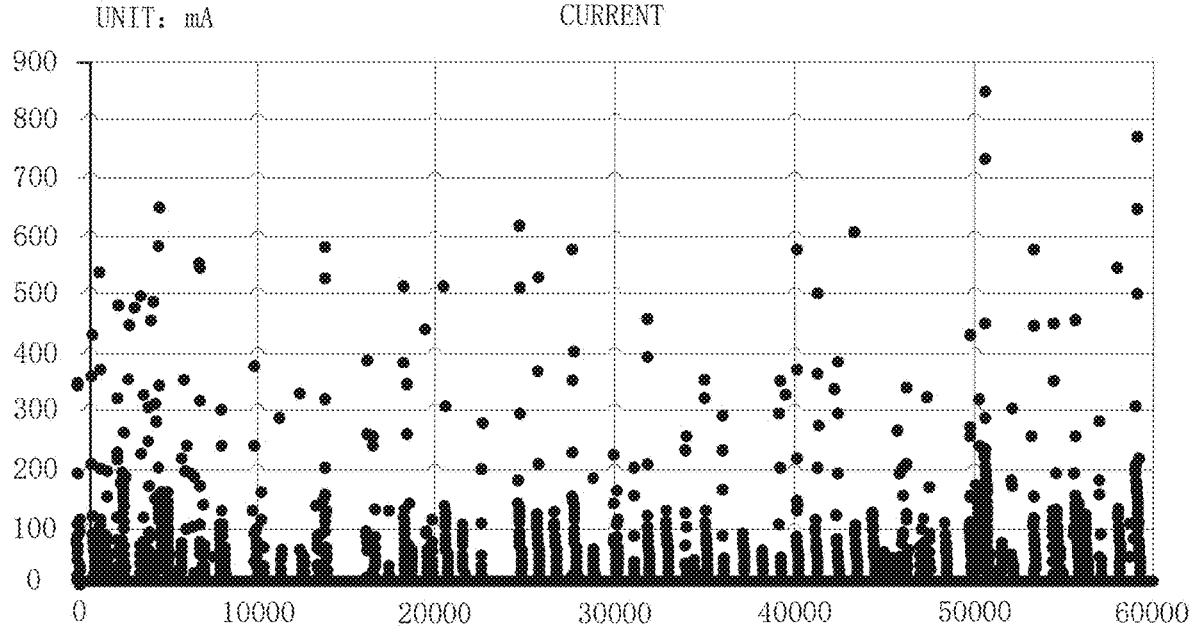
FIG. 1 is a schematic diagram of the relationship between sampling current timing data and time according to some examples.

The technical solutions in some examples of the present disclosure will be clearly and completely described below in conjunction with the accompanying drawings, apparently, the described examples are only some, not all of examples of the present disclosure. All other examples obtained by those skilled in the art based on the examples provided in the present disclosure belong to the claimed scope of the present disclosure.

In description of the present disclosure, the orientation or location relationship indicated by terms "center", "upper", "lower", "front", "back", "left", "right", "vertical", "horizontal", "top", "bottom", "inner", "outer", etc., is based on the orientation or location relationship shown in the drawings, and is only for the convenience of describing the present disclosure and simplifying the description, rather than indicating or implying that the apparatus or element referred to must have a specific orientation or must be constructed and operate in a specific orientation, therefore, should not be construed as limiting the disclosure.

Unless the context requires otherwise, throughout the description and claims, the term "comprising" is interpreted as open and inclusive, e.g., "including, but not limited to".

In the description of the present disclosure, the terms "one example", "some examples", "example", "in some examples" or "some examples" are intended to indicate that a particular feature, structure, material, or characteristic related to the example or example is included in at least one example or example of the present disclosure. Illustrative representations of the terms described above are not necessarily referring to a same example or example. Furthermore, particular feature, structure, material or characteristic described above may be included in any suitable manner in any one or more examples or examples.

Hereinafter, the terms "first" and "second" are used for descriptive purposes only, and should not be understood as indicating or implying relative importance or implicitly specifying the quantity of indicated technical features. Thus, a feature defined as "first" and "second" may explicitly or implicitly include one or more of these features. In the description of examples of the present disclosure, "plurality" means two or more, unless specified otherwise.

In describing some examples, the expressions "coupled" and "connected" and their derivatives may be used. For example, in describing some examples, the term "connected" may be used to indicate that two or more elements are in direct physical or electrical contact with each other. As another example, in describing some examples, the term "coupled" may be used to indicate that two or more elements are in direct physical or electrical contact. However, the term "coupled" may also mean that two or more elements are not in direct contact with each other, but yet still co-operate or interact with each other. Examples disclosed herein are not necessarily limited by the context herein.

"At least one of A, B and C" has the same meaning as "at least one of A, B or C" and both include the following combinations of A, B and C: only A; only B; only C; combination of A and B; combination of A and C; combination of B and C; and combination of A, B and C.

"A and/or B" includes the following three combinations: only A; only B; and combination of A and B.

The use of "suitable for" or "configured to" herein means open and inclusive language that does not exclude devices that are suitable for or configured to perform additional tasks or operations.

Additionally, the use of "based on" is meant to be open and inclusive, as a process, operation, calculation, or other action that is "based on" one or more conditions or values may in practice be based on additional conditions or beyond values.

During the product design, manufacturing, and application verification periods, product performance may be accurately evaluated through measuring characteristic parameters of products under different working conditions with a data collector (e.g., a sensor), and then targeted optimization may be performed. For example, in the product design period, tests for power consumption, performance, etc., are crucial, which can verify the rationality and feasibility of the design solution, help designers find and solve potential problems in the early period, and thus optimize product design. After manufacturing, performance evaluation of the product can ensure that it meets the design specifications and ensures the reliability of the product during usage, which in turn helps manufacturers ensure product quality and reduce defective product rates. In the application verification period, sensors come into play again, and by measuring the characteristic parameters of the product under different working conditions, the performance of the product in actual applications is evaluated.

However, when using sensors to record test data (test data is timing data), the complete transmission and storage of high-speed and high-precision sensor acquisition data (test data) will occupy a large amount of memory space and transmission bandwidth. Taking the testing and recording of Universal Flash Storage (UFS) electrical parameters as an example, the storage of voltage and current data occupies a large amount of memory space of the tester (some special test device used to store and analyze test data), which not only affects the performance of the tester, but also consumes too much time during data transmission. As shown in FIG. 1, the horizontal axis represents time and the vertical axis represents sampling current, in the high-speed sampling process, due to the high sampling frequency and the slow change of the physical characteristics of the target, there is generally no continuous instantaneous mutation, while in high-speed and high-precision acquisition, sensors often output a large number of repeated fields or only small changes in amplitude within a certain period of time, resulting in a large amount of redundancy among data. Through analysis for the data, it may also be found that the repeated high bits of data occupy more storage space, resulting in low data storage efficiency.

Figure 2:
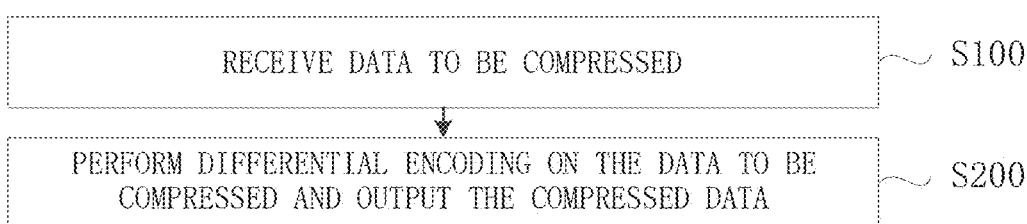
FIG. 2 is a schematic flowchart 1 of a data processing method according to some examples.

The example of the present disclosure provides a data processing method to improve data storage efficiency. As shown in FIG. 2, the data processing method includes the following operations S100 to S200:

S100. receiving data to be compressed.

Figure 3:
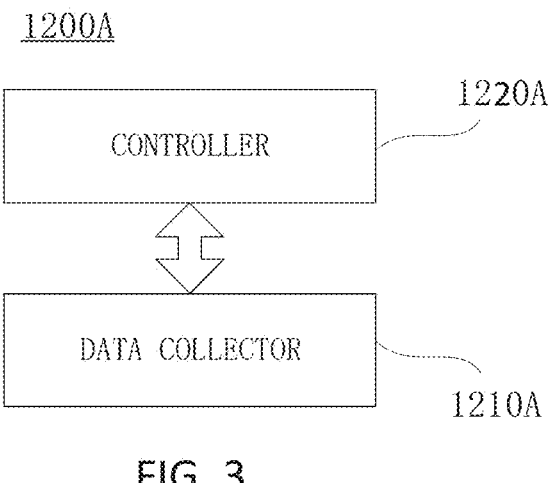
FIG. 3 is a module schematic diagram of a test system according to some examples.
Figure 4:
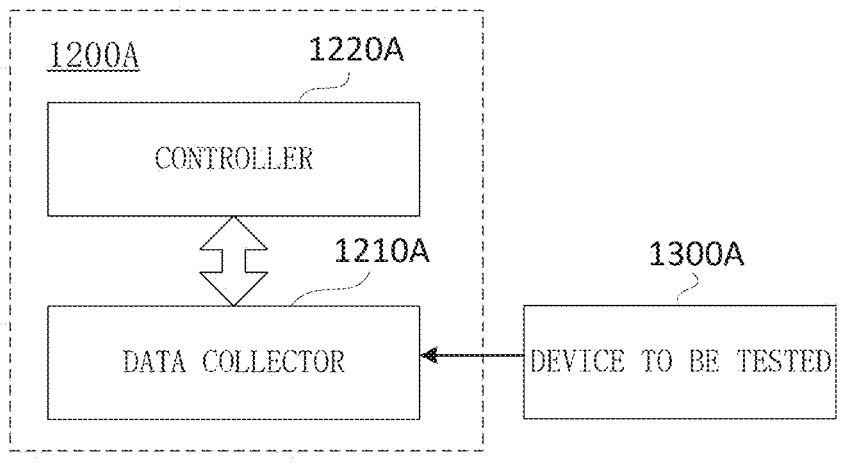
FIG. 4 is a module schematic diagram of an application scenario of a test system according to some examples.
Figure 5:
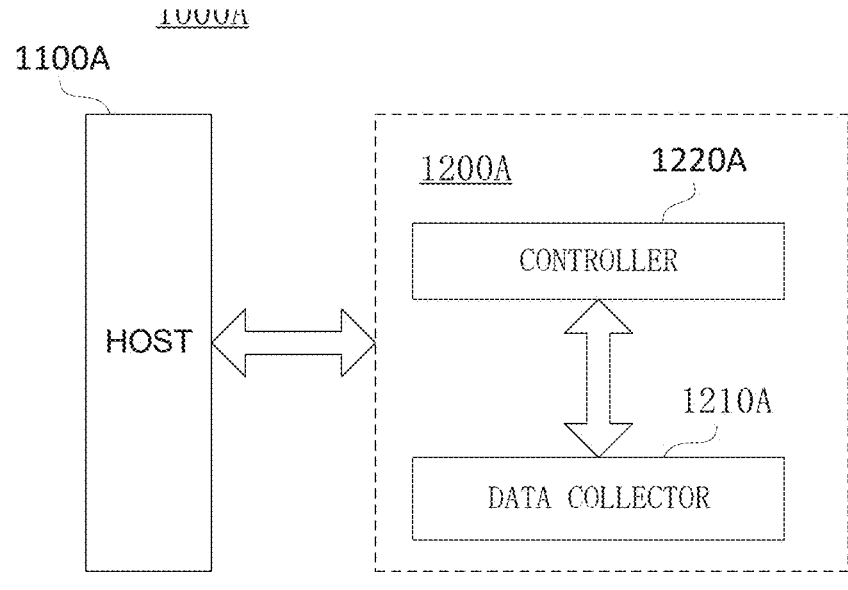
FIG. 5 is a module schematic diagram of an electronic device according to some examples.
Figure 6:
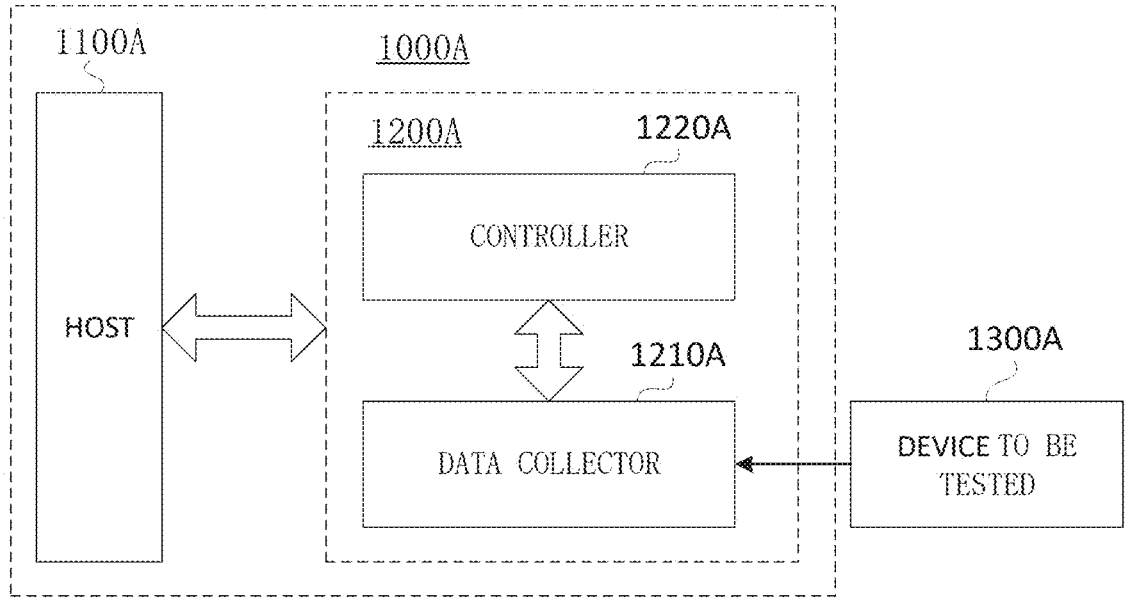
FIG. 6 is a module schematic diagram of an application scenario of an electronic device according to some examples.

In some implementations, the data processing method may be applied to, but is not limited to, a test system 1200A as shown in FIG. 3, an application scenario of a test system 1200A as shown in FIG. 4, an electronic device 1000A including a test system 1200A as shown in FIG. 5, and an application scenario of an electronic device 1000A as shown in FIG. 6 but may also be applied to other hardware processors with data processing capabilities or software modules including data processing functions, which is not limited here. The data to be compressed may include but is not limited to the test data shown in FIG. 1, or may be any data sequence that is repeated or fluctuates slightly.

In some examples, the test system 1200A shown in FIG. 3 includes a data collector 1210A and a controller 1220A, and the data collector 1210A is coupled with the controller 1220A. The test system 1200A may be, but is not limited to, a power consumption test system, which is specifically used to test the power consumption of the product, e.g., a power consumption analyzer, etc. It may also be a performance test system, and according to the product characteristics and test requirements, corresponding performance test instruments such as oscilloscopes, spectrum analyzers, logic analyzers, etc., are selected. These instruments can capture and analyze the performance data of the product during operation, e.g., signal waveforms, frequency responses, logical states, etc. The data collector 1210A may include but is not limited to oscilloscope, spectrum analyzer, logic analyzer, current collector and voltage collector, etc. The controller 1220A may be a hardware processor, or a software module including data processing functions, which has data processing and storage functions, e.g., test software or simulation software.

For example, taking the application scenario test system 1200A as shown in FIG. 4 testing the device to be tested 1300A as an example, the device to be tested 1300A is coupled with the data collector 1210A. The device to be tested 1300A includes but is not limited to Solid-State Drive (SSD), Universal Flash Storage (UFS), Embedded Multimedia Card (cMMC), Universal Flash Storage (UFS), Embedded Multi Chip Package (cMCP) or UFS-based Multichip Package (uMCP). It can also be an electronic device (e.g., a mobile phone) equipped with UFS, eMCP or uMCP. The data collector 1210A is to obtain the test data sequence (also referred to as the full data sequence or the complete data sequence) of the device to be tested 1300A, e.g., the data to be compressed, such as electrical parameters (voltage data and/or current data). The controller 1220A receives the test data sequence, performs differential encoding (or referred to as incremental encoding) on the test data sequence, and outputs compressed data.

In some examples, the electronic device 1000A shown in FIG. 5 includes a host 1100A and a test system 1200A, and the host 1100A is coupled with the test system 1200A. Take the application scenario shown in FIG. 6 as an example. In one example, the controller 1220A receives the test data sequence obtained from the data collector 1210A, performs differential encoding (or referred to as incremental encoding) on the test data sequence, and outputs compressed data (encoded incremental data) to the host 1100A. The host 1100A obtains decompressed data according to the compressed data. In another example, the controller 1220A controls the data collector 1210A to obtain the test data sequence of the device to be tested 1300A, and the data collector 1210A outputs the test data sequence to the host 1100A, the host 1100A receives the test data sequence and performs differential encoding (or referred to as incremental encoding) on the test data sequence to obtain compressed data. The compressed data is used for storage or output.

S200. performing differential encoding on the data to be compressed and outputting the compressed data.

In some implementations, the controller 1220A in the electronic device 1000A shown in FIG. 3, FIG. 4, FIG. 5 or FIG. 6 performing differential encoding on the test data sequence are taken as an example. There are multiple implementations of the controller 1220A performing differential encoding on the test data sequence, including:

Example 1

In some implementations, the controller 1220A performs differential encoding on the test data sequence using the difference between adjacent data points. In some examples, the controller 1220A encodes by storing the full data value at the previous time instance and subtracting the full data value at the current time instance from the full data value at the previous time instance to obtain the difference (incremental value). For example, except for the first data, which keeps the full data unchanged, each data in the sequence is represented as the difference between the current data and the previous data. In some examples, after the controller 1220A is started, a variable prev_value is initialized to 0 (or an invalid value) to store the value of the previous data point. An empty list delta_values is initialized to store incremental data. The controller 1220A receives the test data sequence, and each data point is passed in one by one in chronological order. For each data point current_value in the test data sequence, if prev_value is 0 (or an invalid value), indicating that this is the first data point, then current_value is directly added to the delta_values list and prev_value is updated to current_value. Otherwise, the incremental value delta=current_value−prev_value is calculated and delta is added to the delta_values list. Prev_value is updated to current_value so that the incremental value of the next data point can be calculated. After the test data sequence is processed, the controller 1220A outputs the delta_values list which is taken as incremental data as compressed data. In this example, the controller 1220A may compress the data in the test data sequence while receiving it, or compress the data after receiving a certain amount of test data, or compress the data after receiving all the test data, which is not limited here.

In some examples, as shown in Table 1, the test data sequence received by the controller 1220A is [4, 6, 18, 348, 344], the process of performing incremental encoding on the data according to the above operations is as follows: initializing prev_value=0, delta_values=[ ]; receiving the first data point 4, adding it directly to delta_values, and updating prev_value=4; receiving the second data point 6, calculating the incremental value 6–4=2, adding it to delta_values, and updating prev_value=6. Similarly, after the entire data sequence is processed, delta_values are [4, 2, 12, 330, –4]. Controller 1220A outputs the incremental data sequence [4, 2, 12, 330, –4] as compressed data.

TABLE 1

| complete data (full data) | incremental data | compressed data |
|---|---|---|
| 4 | \ | 4 |
| 6 | 2 | 2 |
| 18 | 12 | 12 |
| 348 | 330 | 330 |
| 344 | –4 | –4 |

In some examples, the test data sequence may be, but is not limited to, voltage data and current data of the device to be tested. The operating state of the device to be tested is determined by the voltage data and current data of the device to be tested. The operating state includes the power consumption of the device to be tested.

It is to be noted that in actual applications, the data received, encoded, and output by the controller 1220A are all binary data, and in the example described above, in order to illustrate the process, the data received, encoded, and output by the controller 1220A are described in decimal. Therefore, in actual applications, regardless of the decimal incremental data or compressed data being positive, zero, or negative, a binary number may correspond to it. It is also to be noted that if decimals appear in decimal incremental data or compressed data, integers may be obtained by rounding up or down.

This example can effectively reduce the redundancy among data in the test data sequence through differential coding technology and improve the efficiency of storage and transmission, thus, not only the problems of data redundancy and storage can be solved, but also the accuracy of the analysis results can be ensured, thereby providing strong support for product performance evaluation and optimization. The encoding conversion from full data to incremental data is implemented, which effectively reduces the storage and transmission requirements of data. This method can reflect data changes in real time and is more sensitive to local changes, because each data point is calculated based on the previous data point, and is very sensitive to changes between adjacent data points, thus this method can capture local fluctuations well and has good real-time performance. No global data information is required, but only adjacent data points are relied on, which helps to reduce the complexity of storage and calculation. For data sequences with small continuous changes, this encoding method can compress data well because it only records a portion of the changes. However, its limitation is that the need to constantly update the previous data point in order to calculate the next differential value may result in increased computational overhead because the previous data point needs to be read and processed each time a new differential value is calculated. This increases the overhead in the calculation process, especially when dealing with large amounts of data or real-time calculations are required, which may affect performance. Meanwhile, it may also destroy the periodicity or trend of the data because it focuses on the changes between adjacent data points.

Example 2

In some implementations, the controller 1220A performs differential encoding on the test data by employing differential encoding based on first data point. In some examples, the data at the starting time (e.g., the first data or the first data point) is stored, and the difference obtained by subtracting the first data from the data at the current time in time sequence is encoded. For example, except for the first data, which keeps the full data unchanged, each data in the sequence is represented as the difference between this data and the first data. In some implementations, after the controller 1220A is started, a variable base_value is initialized to store the value of the first data point in the sequence. An empty list delta_values is initialized to store the incremental data after differential encoding. The controller 1220A receives the test data sequence, and the data points are passed in one by one in chronological order. The controller 1220A firstly reads the first data point in the sequence, assigns it to base_value, and directly adds the data point as the first element of the differential encoding sequence to the delta_values list. For the subsequent data point current_value in the sequence, the controller 1220A calculates the difference delta=current_value–base_value between it and base_value, and adds the difference as incremental data to the delta_values list. After the test data sequence is processed, the controller 1220A outputs the delta_values list which is taken as incremental data after differential encoding as compressed data. In this example, the controller 1220A may compress the data in the test data sequence while receiving it, or compress the data after receiving a certain amount of test data, or compress the data after receiving all the test data, which is not limited here.

In some examples, as shown in Table 2, the test data sequence received by the controller 1220A is [4, 6, 18, 348, 344], the process of performing differential encoding according to the above operations is as follows: initializing base_value=0 (temporarily set to 0 here, actually updated after the first data point is read), delta_values=[ ]; reading the first data point 4, assigning it to base_value (base_value=4 at this point), and adding 4 as the first element of the differential encoding sequence to the delta_values. For subsequent data points: the difference between data point 6 and base_value (4) is 2, and 2 is added to delta_values. The difference between data point 18 and base_value (4) is 14, and 14 is added to delta_values. The difference between data point 348 and base_value (4) is 344, and 344 is added to delta_values. The difference between data point 344 and base_value (4) is 340, and 340 is added to delta_values. Controller 1220A outputs the incremental data sequence [4, 2, 14, 344, 340] after differential encoding as compressed data.

TABLE 2

| complete data (full data) | incremental data | compressed data |
|---|---|---|
| 4 | \ | 4 |
| 6 | 2 | 2 |

TABLE 2-continued

| complete data (full data) | incremental data | compressed data |
|---|---|---|
| 18 | 14 | 14 |
| 348 | 344 | 344 |
| 344 | 340 | 340 |

It is to be noted that in actual applications, base_value is directly set to the value of the data point after the first data point is read, without being initialized to 0. In the example described above, in order to illustrate the process, base_value is temporarily initialized to 0.

This example implements differential encoding based on first data point through the controller 1220A, which effectively reduces the amount of data transmitted and stored. In scenarios where a large amount of data needs to be transmitted frequently, differential encoding can significantly improve the efficiency and reliability of data transmission, saving bandwidth and storage space. In another aspect, it avoids the risk of error accumulation: since each data point is compared with the starting data point (e.g., the first data point) to obtain the difference, the error of a single data point will not affect the difference calculation of other data points, thereby avoiding the propagation of errors. High data recovery efficiency: Restoring from incremental data to original data simply adds each difference to the starting data point, which is a simple addition operation, thus data recovery is more efficient. Sensitive to global changes: By comparing the difference between the current data point and the starting data point, the global characteristics of the data, including periodicity or trend, can be better preserved. However, its limitation is that the compression efficiency is affected by the first data point, and if the first data point itself is a large value, the difference with subsequent data points may also be large, resulting in reduced encoding efficiency. It is not sensitive to local changes, since the comparison is always against the first data point, this method may not be able to effectively capture the local change pattern in the data sequence.

Example 3

In order to solve the technical problems that may exist in differential encoding based on first data point. In some implementations, the controller 1220A performs differential encoding on the test data by employing differential encoding based on multi-base value segmented compression, aiming to optimize the compression effect by dynamically determining multiple base values. In some implementations, firstly, the first data in the test data sequence is selected as data_base1 (first base value). Secondly, according to the time sequence, the data after data_base1 is subtracted from data_base1 to obtain an incremental value, and if the incremental value is within the preset range of incremental values, the incremental value is stored. If the incremental value does not fall within the preset range, the data is stored as data_base2 (second base value). According to the time sequence, the data after data_base2 is subtracted from data_base2 to obtain an incremental value, and if the incremental value is within the preset range of incremental values, the incremental value is stored. If the increment does not fall within the preset range, the data is stored as data_base3 (third base value). And so on until the last data in the test data sequence. The storage space allocated for the incremental value is less than the storage space allocated for the base value. In order to distinguish the base value from the incremental value, a few bits of storage space are allocated before each base value to store an identifier. The identifier is to distinguish the base value from the incremental value. In this example, the controller 1220A may compress the data in the test data sequence while receiving it, or compress the data after receiving a certain amount of test data, or compress the data after receiving all the test data, which is not limited here.

In some examples, as shown in Table 3:

TABLE 3

| 8 bits | 16 bits | 4 bits | 4 bits | 4 bits | 4 bits | 8 bits | 16 bits | 4 bits | 4 bits |
|---|---|---|---|---|---|---|---|---|---|
| $\Delta$len1 | data_base1 | $\Delta$2 | $\Delta$3 | . . . | $\Delta$n | $\Delta$len2 | data_basen + 1 | $\Delta$n + 2 | . . . |

In the compressed data shown in Table 3, the identifier is $\Delta$len, and each $\Delta$len is allocated 8 bits of storage space, ranging from 0 to 255. In an aspect, $\Delta$len is to indicate that the data stored in the next preset bits (determined according to the size of the storage space allocated for the base value in advance, such as 16 bits) is the base value. In another aspect, it is also used to indicate the number of $\Delta$ (incremental values) stored after the corresponding base value. $\Delta$x is the actual stored $\Delta$ value, and each $\Delta$ value may be allocated 4 bits of storage space, ranging from 0 to 15, which may support the storage of fluctuation incremental values within $-7$ to $+8$ relative to the base value. The storage space allocated for each $\Delta$ value may be set according to actual conditions, which is not limited there. At the same time, the fluctuation range of the incremental value (preset range of incremental values) is related to the size of the storage space allocated for the incremental value (the storage space occupied by the incremental value), and the size of the storage space occupied by the incremental value and the preset range of incremental values may be in a one-to-many relationship.

In some examples, as shown in Table 4, the test data sequence received by the controller 1220A is [4, 6, 11, 100, 98, 98, 96, 348, 344]. The compression process includes: initializing data base1 to 4. $\Delta=2$ is obtained by comparing 6 with 4, which is within the range, and $\Delta=2$ is stored. $4=7$ is obtained by comparing 11 with 4, which is within the range, and $\Delta=7$ is stored. $\Delta=96$ obtained by comparing 100 with 4, which is out of range, thus 100 is stored as data base2. $\Delta$len1 is recorded as 2 (indicating that according to the timing, after data_base1, there are 2 test data based on data base1 with $\Delta$ values within the preset range of increment values). The subsequent data is compared with data_base2 and the above process is repeated. Compression results (as shown in Table 4): $\Delta$len1:2 (indicating that according to the timing, after data_base1, there are 2 test data based on data_base1 with $\Delta$ values within the preset range of increment values), data_base1:4, $\Delta$1:2, $\Delta$2:7. $\Delta$len2:3 (indicating that according to the timing, after data_base2, there are 3 test data based on data base2 with $\Delta$ values within the preset range of increment values), data_base2:100, $\Delta$3:2, $\Delta$4:$-2$, $\Delta$5:0. $\Delta$len3:1 (indicating that there is 1 $\Delta$ value based on the next base value). Next base value (here data_base3): 348, $\Delta$6:$-4$, Δlen3:1 (indicating that according to the timing, after data-_base3, there are 1 test data based on data_base3 with Δ values within the preset range of increment values). According to the preset storage structure, the data described above is stored in the corresponding fields.

TABLE 4

| 8 bits | 16 bits | 4 bits | 4 bits | 8 bits | 16 bits | 4 bits | 4 bits | 4 bits | 8 bits | 16 bits | 4 bits |
|---|---|---|---|---|---|---|---|---|---|---|---|
| 2 | 4 | 2 | 7 | 3 | 100 | 2 | 2 | 4 | 1 | 348 | −4 |

In some examples, taking the data format shown in Table 3 as an example, the test data sequence received by the controller 1220A is (e.g., current sampling data) 60*1024 groups, with a precision of 16 bits, occupying 120 Kbytes of storage space, and the data distribution is shown in Table 5:

TABLE 5

| | | | | | | 16*2 | bytes | | | | | | | | |
|---|---|---|---|---|---|---|---|---|---|---|---|---|---|---|---|
| 4 | 2 | 2 | 4 | 2 | 2 | 0 | 2 | 4 | 4 | 6 | 4 | 4 | 4 | 4 | 4 |
| 2 | 0 | 2 | 2 | 2 | 2 | 4 | 2 | 2 | 2 | 2 | 4 | 2 | 2 | 4 | 2 |
| 4 | 6 | 18 | 348 | 344 | 192 | 102 | 62 | 46 | 50 | 64 | 78 | 78 | 72 | 60 | 58 |
| 58 | 58 | 68 | 66 | 62 | 52 | 44 | 40 | 40 | 40 | 50 | 58 | 62 | 62 | 54 | 52 |
| 54 | 54 | 0 | 0 | 32 | 38 | 42 | 40 | 38 | 36 | 36 | 38 | 44 | 50 | 58 | 58 |
| 76 | 84 | 90 | 96 | 104 | 108 | 96 | 0 | 104 | 104 | 100 | 106 | 114 | 110 | 108 | 108 |
| 100 | 98 | 98 | 96 | 94 | 92 | 94 | 96 | 98 | 92 | 0 | 0 | 0 | 52 | 46 | 36 |
| 28 | 22 | 14 | 14 | 10 | 8 | 8 | 4 | 6 | 6 | 4 | 6 | 4 | 6 | 0 | 0 |

3840 rows

...

After calculation by the algorithm, data_base, Δlen, and the number of Δ are shown in Table 6:

TABLE 6

| Type | Count | Bytes | Sum |
|---|---|---|---|
| data_base | 3441 | 2 | 6882 |
| Δlen | 3441 | 1 | 3441 |
| Δ | 57999 | 0.5 | 28999.5 |

The final occupied storage space is: 38.4 KB, which saves 68% of the space compared to 120 KB before compression.

This example determines multiple base values to compress the test data according to magnitude of the fluctuation of the test data and the preset range of incremental values, and obtains multiple segments of compressed data, e.g., new base values at locations where test data undergoes large mutations are determined to avoid large differential values later, which would result in poor compression effects. Meanwhile, the test data is not always compared with the first base value, but according to magnitude of the fluctuation of the test data, multiple base values may be recorded as comparison objects, which may effectively capture the local change pattern in the data sequence. However, its limitation is that although the test data sequence is compressed in segments, the compression efficiency of each segment is affected by the first data point in each segment, and if the first data point itself is a large value, the difference with subsequent data points may also be large, resulting in reduced encoding efficiency.

Example 4

The compression efficiency of differential encoding based on multi-base value segmented compression is to be improved. In some implementations, segmented compression is performed on the test data sequence based on a preset range of incremental values, and the average of the maximum and minimum of each segment of the test data sequence after segmentation is the base value of the corresponding segment. In some implementations, taking the selection of the first base value as an example, the first base value is determined according to the preset range of incremental values. If the storage space allocated to the incremental value is 2 bits, the preset range of incremental values includes 4 incremental values (e.g., −1~2, 0~3 or 2~5, etc.), and the size of the storage space occupied by the incremental value and the preset range of incremental values may be in a one-to-many relationship. If the storage space allocated to the incremental value is 3 bits, the preset range of incremental values includes 8 incremental values (e.g., −3~4, −2~5, −1~7, 0~7 or 2~9 etc.). If the storage space allocated to the incremental value is 4 bits, the preset range of incremental values includes 16 incremental values (e.g., −7~8, −5~10, 0~15, 1~16 or 3~18 etc.). Secondly, according to the preset range of increment values, starting from the first data point in the test data sequence, other data in the test sequence will be traversed backwards until the range of the traversed data is greater than the range of the preset range (or until the last data point in the test data sequence), the average of the maximum and minimum in the traversed data (excluding the last traversed data) (if the average is a decimal, it needs to be rounded up or down) is used as the first base value. This may increase the Δlen value and further improve the compression efficiency. Similarly, the controller 1220A may continue to traverse the subsequent data to determine the second base value, the third base value, etc., to adapt to more complex data compression requirements. In this example, the controller 1220A may compress the data in the test data sequence after receiving a certain amount of test data, or compress after receiving all the test data, which is not limited here.

In some examples, the mapping relationship between each decimal incremental value and the binary incremental value in the preset range of incremental values may be shown in Table 7, Table 8 and Table 9 below (in these tables, D represents decimal and B represents binary):

If the storage space allocated for the incremental value is 2 bits, and the preset range of incremental values is −1 to +2, the corresponding relationship with the binary is shown in Table 7:

TABLE 7

|   | 2 bits | 2 bits | 2 bits | 2 bits |
|---|---|---|---|---|
| D | −1 | 0 | 1 | 2 |
| B | 00 | 01 | 10 | 11 |

If the storage space allocated for the incremental value is 3 bits, and the preset range of incremental values is −3~+4, the corresponding relationship with the binary is shown in Table 8:

TABLE 8

|   | 3 bits | 3 bits | 3 bits | 3 bits | 3 bits | 3 bits | 3 bits | 3 bits |
|---|---|---|---|---|---|---|---|---|
| D | −3 | −2 | −1 | 0 | 1 | 2 | 3 | 4 |
| B | 000 | 001 | 010 | 011 | 100 | 101 | 110 | 111 |

If the storage space allocated for the incremental value is 4 bits, and the preset range of incremental values is −7~+8, the corresponding relationship with the binary is shown in Table 9:

TABLE 9

|   | 4 bits | 4 bits | 4 bits | 4 bits | 4 bits | 4 bits | 4 bits | 4 bits | 4 bits | 4 bits | 4 bits | 4 bits | 4 bits | 4 bits | 4 bits | 4 bits |
|---|---|---|---|---|---|---|---|---|---|---|---|---|---|---|---|---|
| D | −7 | −6 | −5 | −4 | −3 | −2 | −1 | 0 | 1 | 2 | 3 | 4 | 5 | 6 | 7 | 8 |
| B | 0000 | 0001 | 0010 | 0011 | 0100 | 0101 | 0110 | 0111 | 1000 | 1001 | 1010 | 1011 | 1100 | 1101 | 1110 | 1111 |

The mapping relationships shown in Table 7, Table 8 and Table 9 are only used as partial example illustrations and do not represent all mapping relationships.

For example, the compression effects of the corresponding schemes of example 3 and example 4 are compared. The case that the test data sequence including: 4, 6, 7, 11, 13, 16, 17, and the preset range of increment values is −3~+4 is taken as an example. The scheme corresponding to example 3 is employed: the base value is the first data in the test data sequence or the data with large fluctuations, the compressed data is shown in Table 10:

TABLE 10

|   | 8 bits | 16 bits | 3 bits | 3 bits | 8 bits | 16 bits | 3 bits | 8 bits | 16 bits | 3 bits |
|---|---|---|---|---|---|---|---|---|---|---|
| D | 2 | 4 | 2 | 3 | 1 | 11 | 2 | 1 | 16 | 1 |
| B | 00000010 | 0000000000000100 | 010 | 011 | 00000001 | 0000000000001011 | 010 | 001 | 0000000000010000 | 001 |

The scheme corresponding to example 4 is employed: segmented compression is performed on the test data sequence based on a preset range of incremental values, and the average of the maximum and minimum of each segment of the test data sequence after segmentation is the base value of the corresponding segment, if the average is a decimal, take rounding down as an example, and the compressed data is as shown in Table 11:

TABLE 11

|   | 8 bits | 16 bits | 3 bits | 3 bits | 3 bits | 3 bits | 8 bits | 16 bits | 3 bits | 3 bits | 3 bits |
|---|---|---|---|---|---|---|---|---|---|---|---|
| D | 4 | 7 | −3 | −1 | 0 | 3 | 2 | 15 | −2 | 1 | 2 |
| B | 00000100 | 0000000000000111 | 000 | 010 | 011 | 110 | 00000010 | 0000000000001111 | 001 | 100 | 101 |

Compared with the compressed data shown in Table 11, the $\Delta$len of the compressed data shown in Table 10 is changed from 2 in Table 10 to 4, and for the compression of a same group of test data sequences, the storage space occupied by the compressed data shown in Table 10 is 84 bits, while the storage space occupied by the compressed data shown in Table 11 is 69 bits.

Example 5

Figure 7:
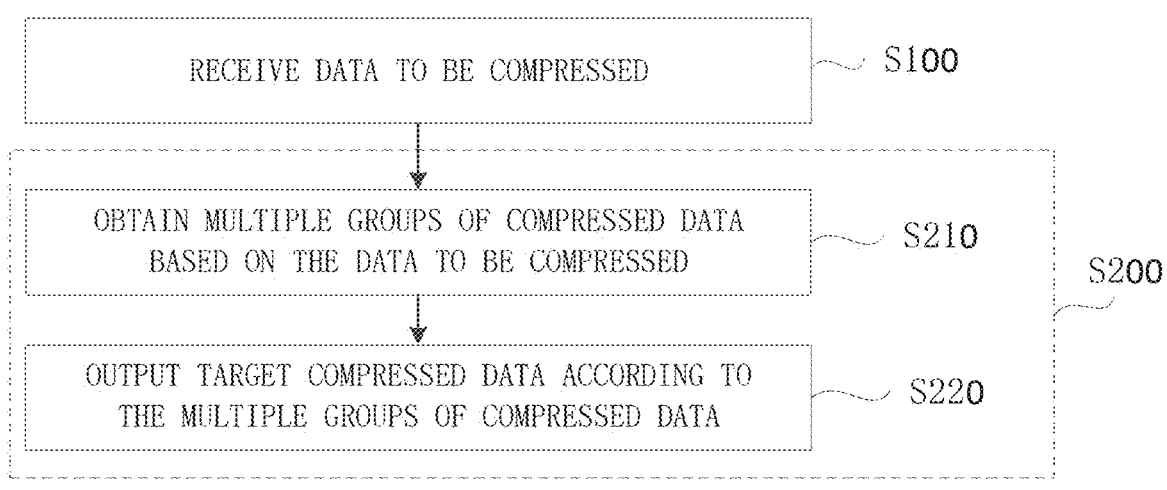
FIG. 7 is a schematic flowchart 2 of a data processing method according to some examples.

The compression efficiency of differential encoding based on multi-base value segmented compression is to be further improved. In some other possible implementations, the controller 1220A may set multiple preset range of increment values, and a same group of test data sequences may be compressed based on different preset ranges of increment values, and the compression effects may be different, therefore, the test data sequence may be compressed based on different preset ranges of increment values to obtain multiple compressed data, from which the data with the highest compression efficiency is selected as the target compressed data. In this example, the controller 1220A may compress the data in the test data sequence after receiving a certain amount of test data, or compress after receiving all the test data, which is not limited here. In some implementations, operations S210-S220 as shown in FIG. 7 specifically include:

S210. obtaining multiple groups of compressed data based on the data to be compressed.

In some examples, different groups of the compressed data in the multiple groups of compressed data are obtained based on different preset ranges of increment values.

S220. outputting target compressed data according to the multiple groups of compressed data.

In some examples, the case where the test data sequence includes: 4, 6, 7, 11, 13, 16, 17, the preset range of increment values is −7 to +8, the base value is determined by the method of this proposal, and if the mean is a decimal, round down is performed, is taken as an example, the compressed data is shown in Table 12:

TABLE 12

| | 8 bits | 16 bits | 4 bits | 4 bits | 4 bits | 4 bits | 4 bits | 4 bits | 4 bits |
|---|---|---|---|---|---|---|---|---|---|
| D | 7 | 10 | −6 | −4 | −3 | 1 | 3 | 6 | 7 |
| B | 00000111 | 0000000000001010 | 0001 | 0011 | 0100 | 1000 | 1010 | 1101 | 1111 |

Compared with the compressed data shown in Table 12, the $\Delta$len of the compressed data shown in Table 11 is changed from 4 in Table 11 to 7 in Table 12, and for the compression of a same group of test data sequences, the storage space occupied by the compressed data shown in Table 11 is 69 bits, while the storage space occupied by the compressed data shown in Table 12 is 52 bits. Therefore, for this group of test data sequences, the compression efficiency based on the preset range of increment values of −7 to +8 is higher than the compression efficiency based on the preset range of increment values of −3 to +4.

However, in the schemes corresponding to the examples 3, 4 and 5 described above, the identifier $\Delta$len will occupy a large part of the storage space, which will cause a certain amount of space waste. Meanwhile, decompression can only be performed as a whole, because the decompression can only start from the first identifier, otherwise it is difficult to distinguish the base value and the incremental value.

Example 6

In order to reduce the storage space occupied by the identifier and improve the flexibility of decompression, in some implementations, this example provides a compression scheme as shown in Table 13. In Table 13, each test data sequence occupies 15 bits of memory space, and when the test data sequence is compressed, the identifier occupies 1 bit, the occupied bit is the highest bit or lowest bit of every 16 bits. When the identifier is 1, it indicates that the current 15 bits store the base value, and when the identifier is 0, it indicates that the current 15 bits store the incremental value. The identifier is only to indicate whether the current value is the base value or the incremental value, and the number of A (incremental values) stored after the corresponding base value is canceled. In this example, the controller 1220A may compress the data in the test data sequence after receiving a certain amount of test data, or compress after receiving all the test data, which is not limited here.

the compressed data. In some scenarios, if the incremental value does not occupy 15 bits, there are two processing methods: one method is to convert the incremental value into a full value for storage, for example, no compression. The second method is to fill the unfilled part with 1 or 0, this requires that all 1s or all 0s cannot be used to represent specific values, which will result in a reduction in the data range that can represent incremental values. Therefore, this second processing method will be used less. The base value may be some full data in the test data sequence (the full data as the base values will not be compressed), or the base value may be determined by the scheme corresponding to the example 4.

In this example, the data in the test data sequence is encoded in a specific format to implement compressed storage of data. During the compression process, the base value and the incremental value are stored completely in bytes and distinguished by a specific identifier. This design allows decompression to start from any segment of the compressed data containing the base value when decompressing the data, without having to start from the initial location of the compressed data. This decompression method greatly improves the flexibility and efficiency of decompression, allowing data to be restored and used more quickly and conveniently.

Figure 8:
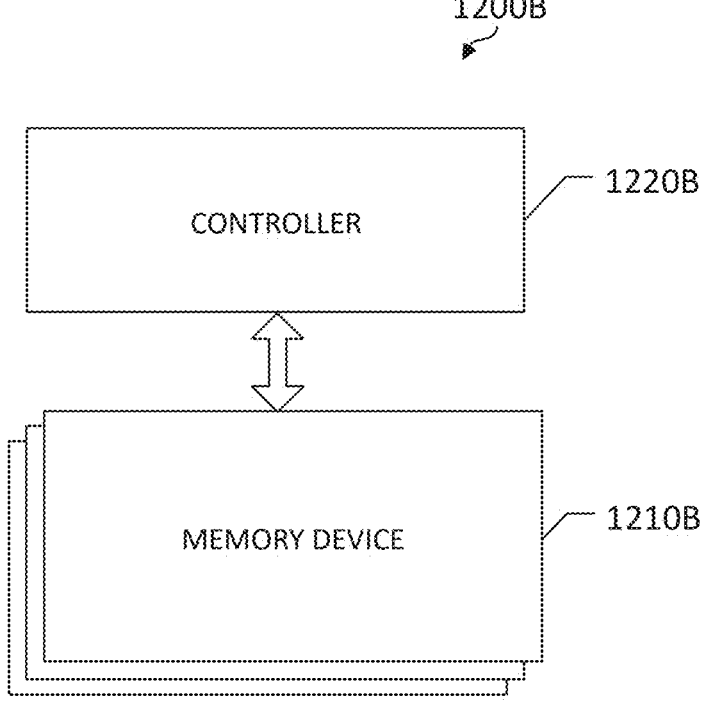
FIG. 8 is a module schematic diagram of a memory system according to some examples.
Figure 9:
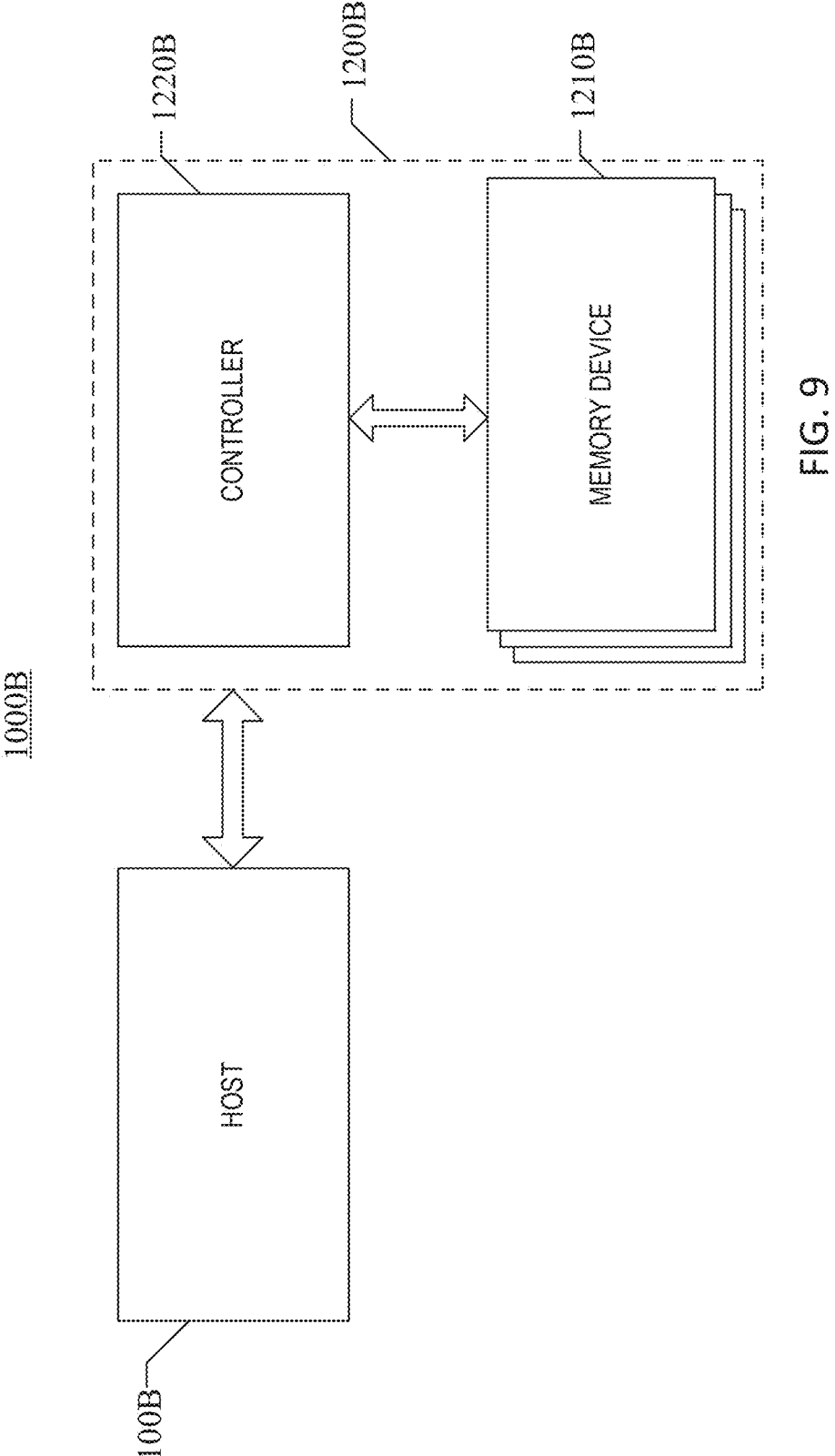
FIG. 9 is a module schematic diagram of an electronic device according to some examples.

The data processing method provided by an example of the present disclosure may also be applied to the memory system 1200B shown in FIG. 8 and the electronic device 1000B encapsulated with the memory system 1200B as shown in FIG. 9, e.g., mobile phone (e.g., cell phone), desktop computer, tablet computer, laptop computer, server, vehicle-mounted device, game console, printer, positioning device, wearable device (e.g., smart watch, smart bracelet, smart glasses, etc.), smart sensor, mobile power supply, Virtual Reality (VR) device, Augmented Reality (AR) device, or any other suitable electronic device having memory device therein. As shown in FIG. 8, the memory

TABLE 13

| bit 0 | bit 1 | bit 2 | bit 3 | bit 4 | bit 5 | bit 6 | bit 7 | bit 8 | bit 9 | bit 10 | bit 11 | bit 12 | bit 13 | bit 14 | bit 15 |
|---|---|---|---|---|---|---|---|---|---|---|---|---|---|---|---|
| 1 | | | | | | | | data0 | | | | | | | |
| 0 | | | $\Delta 1$ | | | | | $\Delta 2$ | | | | | $\Delta 3$ | | |
| 0 | | | $\Delta 4$ | | | | | $\Delta 5$ | | | | | $\Delta 6$ | | |
| 1 | | | | | | | | data7 | | | | | | | |

In this scheme, the identifier and the base value occupy a certain size of bits (the sum of the number of bits occupied by the identifier and the number of bits occupied by the base value), e.g., the identifier occupies 1 bit and the base value occupies 15 bits, and when the sample data is being compressed, an identifier is included every 16 bits, and the identifier occupies the highest bit or lowest bit of the 16 bits. During decompressing, decompression is performed in a unit of 16 bits, and it is determined whether the full data (or base value) or the incremental value is stored at the current location according to the identifier of the highest bit or lowest bit in the 16 bits, to complete the decompression of system 1200B includes a memory device 1210B and a controller 1220B (which may be the controller 1220A in FIG. 3, FIG. 4, FIG. 5 or FIG. 6), and the memory device 1210B and the controller 1220B are coupled. The controller 1220B receives the data to be compressed from an external device (which may be the host 1100B as shown in FIG. 9), differentially encodes the data to be compressed, obtains the compressed data and stores it in the memory device 1210B. The implementation of differentially encoding the data to be compressed by the controller 1220B is the same as the implementation of differentially encoding the test data sequence by the controller 1220A in FIG. 3, FIG. 4, FIG. 5 or FIG. 6, which will not be repeated here. As shown in FIG. 9, the electronic device 1000B includes a host 1100B and a memory system 1200B. The host 1100B and the memory system 1200B are coupled. The controller 1220B receives the data to be compressed from the host 1100B, differentially encodes the data to be compressed, obtains the compressed data and stores it in the memory device 1210B. The implementation of differentially encoding the data to be compressed by the controller 1220B is the same as the implementation of differentially encoding the test data sequence by the controller 1220A in FIG. 3, FIG. 4, FIG. 5 or FIG. 6, which will not be repeated here.

In some implementations, the host 1100B may be a processor of an electronic device, e.g., the processor may be a chip, specifically a Field Programmable Gate Array (FPGA), an Application Specific Integrated Circuit (ASIC), a System on Chip (SoC), a Central Processor Unit (CPU), a Network Processor (NP), a digital signal processing circuit (Digital Signal Processor, DSP), a microcontroller (Micro Controller Unit, MCU), a Programmable Logic Device (PLD), an Application Processor (AP) or other integrated chips.

According to some implementations, the controller 1220B is coupled to the memory device 1210B and the host 1100B, and is configured to control the memory device 1210B. The controller 1220B may manage data stored in the memory device 1210B and communicate with the host 1100B. In some implementations, the controller 1220B is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc. In some implementations, the controller 1220B is designed to operate in high duty cycle environments e.g., Solid-State Drive (SSD) or Embedded MultiMedia Card (eMMC), which is used as data storage for mobile electronic devices such as smartphone, tablet computer, personal computer, and enterprise storage array. The controller 1220B may be configured to manage data stored in the memory device 1210B and communicate with an external device (e.g., a host, in which a host is provided). Operations of the memory device 1210B are controlled, such as read, erase, and program operations. In some examples, the controller 1220B may also be configured to manage various functions related to data stored or to be stored in the memory device 1210B, including but not limited to bad block management, garbage collection, logical to physical address conversion, wear leveling, etc. In some implementations, the controller 1220B is also configured to process error correction code (ECC) related to data read from or written into the memory device 1210B. Any other suitable functions may also be performed by controller 1220B, e.g., formatting memory device 1210B. The controller 1220B may communicate with external devices (e.g., host 1100B) according to a particular communication protocol. For example, the controller 1220B may communicate with external devices through at least one of various interface protocols, such as USB protocol, MultiMedia Card (MMC) protocol, Peripheral Component Interconnect (PCI) protocol, PCI Express (PCI-E) protocol, Advanced Technology Attachment (ATA) protocol, Serial ATA protocol, Parallel ATA protocol, Small Computer System Interface (SCSI) protocol, Enhanced Small Drive Interface (ESDI) protocol, Integrated Device Electronics (IDE) protocol, Firewire protocol, etc.

Of course, the controller 1220B may also perform any other suitable functions, e.g., formatting memory device 1210B. For example, the controller 1220B may communicate with an external device (e.g., host) through at least one of various interface protocols.

It is to be noted that interface protocol includes at least one of USB protocol, MMC protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

Figure 11:
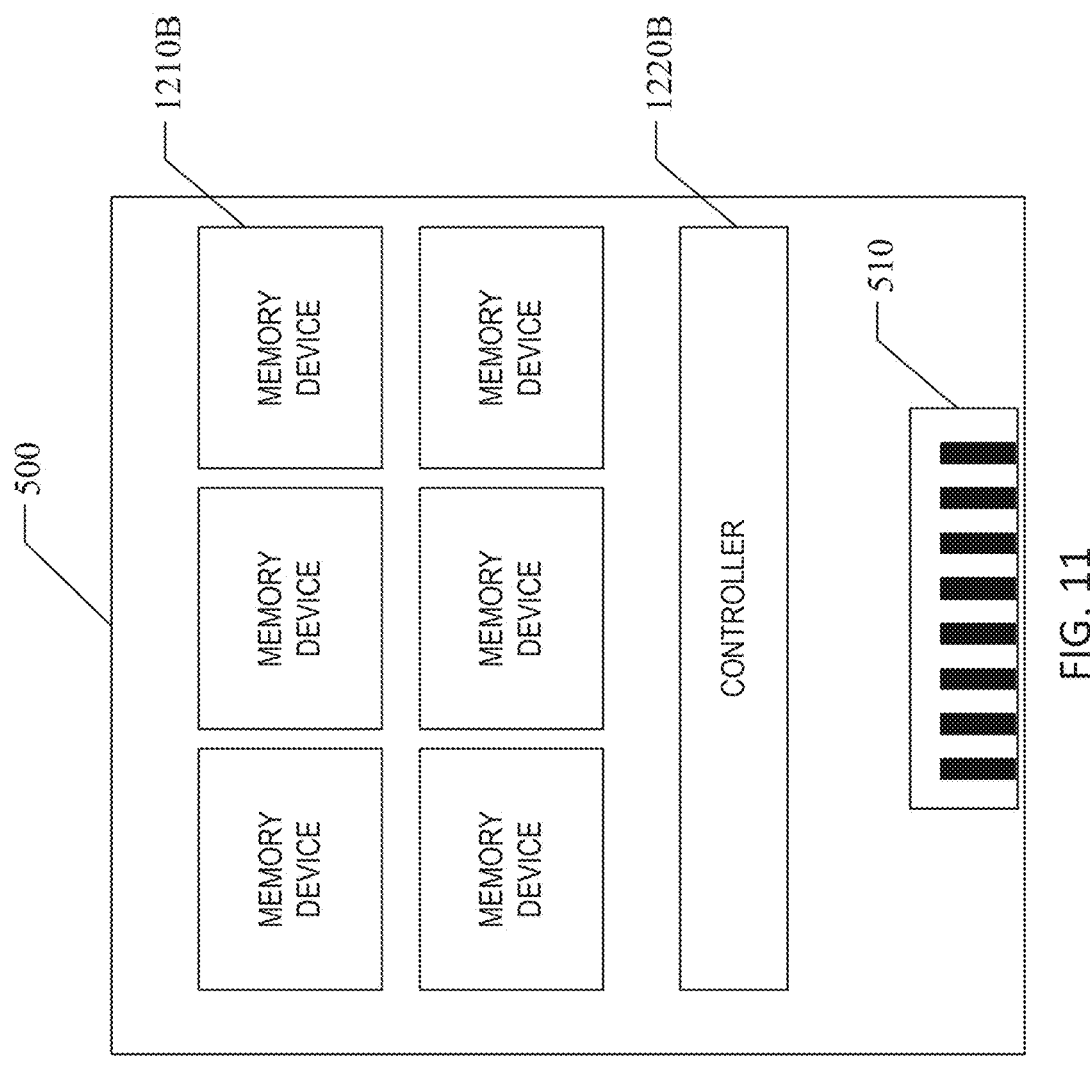
FIG. 11 is a module schematic diagram of a solid-state drive according to some examples.
Figure 10:
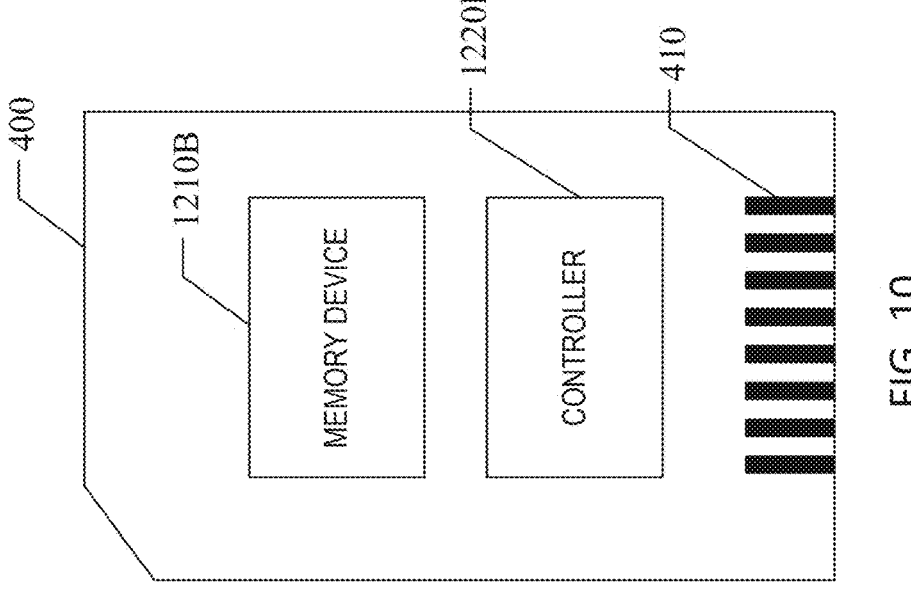
FIG. 10 is a module schematic diagram of a memory card according to some examples.

The controller 1220B and the one or more memory devices 1210B may be integrated into various types of memory systems, e.g., included in a same package, such as Embedded Multimedia Card (eMMC), Universal Flash Storage (UFS) package, Embedded Multi Chip Package (cMCP) package or UFS-based Multichip Package (uMCP) package. Among them, cMMC adopts a unified MMC standard interface to encapsulate high-density NAND and MMC controller in a Ball Grid Array (BGA) package chip. UFS is an advanced version of eMMC, which is also an array storage module composed of multiple flash memory chips and controllers. UFS makes up for the defect that cMMC only supports half-duplex operation (read and write must be performed separately), and may achieve full-duplex operation, so the performance may be doubled. cMCP formed by packaging a volatile memory such as Static Random-Access Memory (SRAM) or Dynamic Random-Access Memory (DRAM) packaged on eMMC. In some implementations, DRAM may be a Low Power Double Data Rate SDRAM (LPDDR). uMCP is formed by packaging volatile memory (such as SRAM or DRAM) on UFS, which has high performance and large capacity. In some implementations, DRAM may be LPDDR. For example, the memory system 1200B may be implemented and packaged into different types of final electronic devices. In one example as shown in FIG. 10, the controller 1220B and the single memory device 1210B may be integrated into the memory card 400. The memory card 400 may include a PC card (PCMCIA, Personal Computer Memory Card International Association), CF card, Smart Media (SM) card, memory stick, multimedia card (MMC, RS-MMC, MMCmicro), SD card (SD, miniSD, microSD, SDHC), UFS, etc. Memory card 400 may further include a memory card connector 410 coupling THE memory card 400 with a host (e.g., host 1100B in FIG. 9). In another example as shown in FIG. 11, the memory controller 1220B and multiple memory devices 1210B may be integrated into SSD203. SSD500 may further include an SSD connector 510 coupling the SSD500 with a host (e.g., host 1100B in FIG. 1). In some implementations, the storage capacity and/or operating speed of SSD500 is greater than the storage capacity and/or operating speed of memory card 400.

Figure 12:
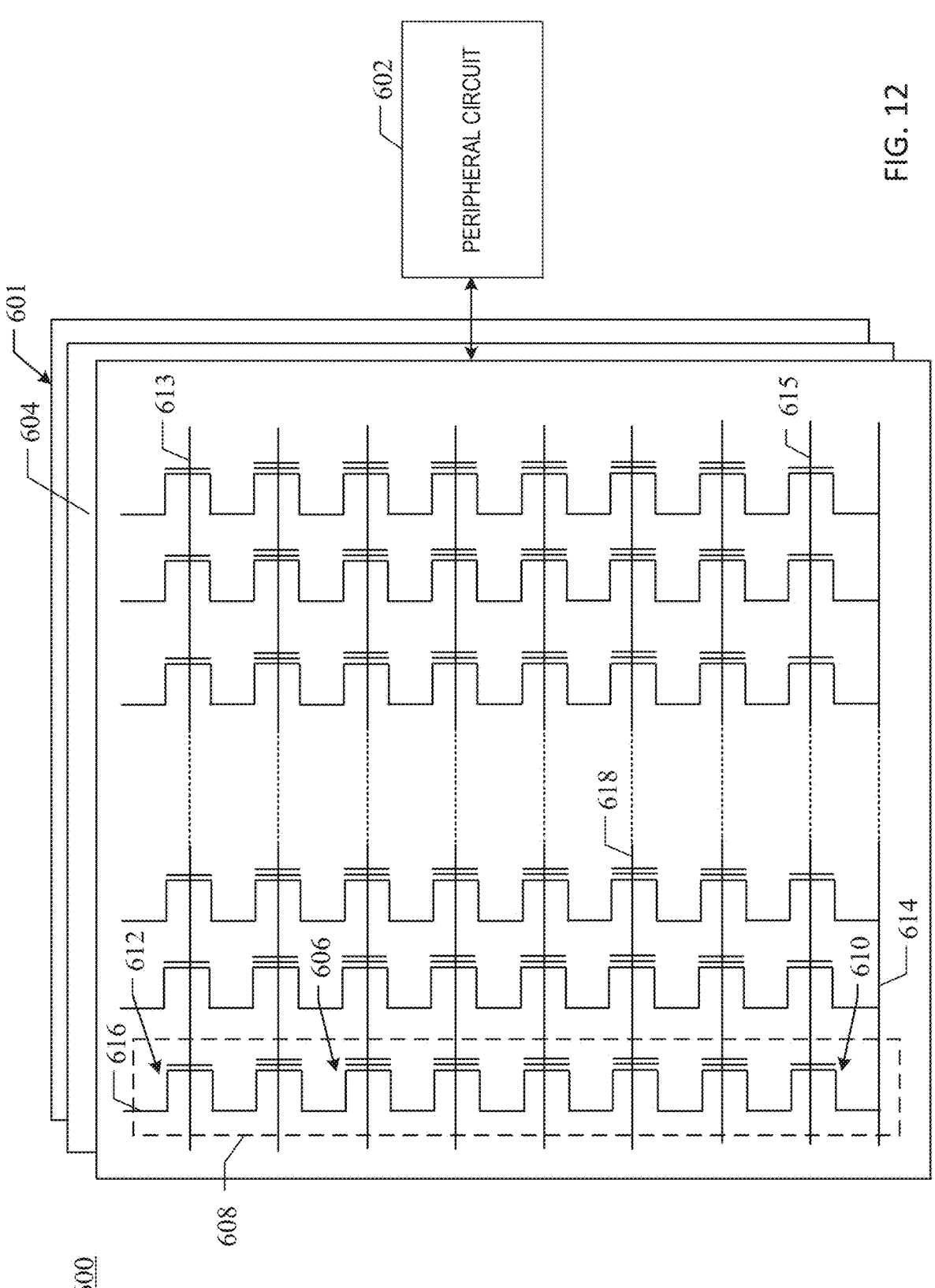
FIG. 12 is a module schematic diagram 1 of a memory device according to some examples.

FIG. 12 illustrates a schematic circuit diagram of an example memory device 600 including peripheral circuit 602 according to some aspects of the present disclosure. Memory device 600 may be an example of memory device 1210B in FIG. 8 or FIG. 9. The memory device 600 may include a memory cell array 601 and a peripheral circuit 602 coupled to the memory cell array 601. The memory cell array 601 may be a NAND flash memory cell array, where the memory cells 606 are provided in the form of an array of NAND memory strings 608 each extending vertically above a substrate (not shown). In some implementations, each NAND memory string 608 includes multiple memory cells 606 coupled in series and stacked vertically. Each memory cell 606 is able to retain a continuous analog value, e.g., voltage or charge, depending on the number of electrons trapped within the region of the memory cell 606. Each memory cell 606 may be a "floating gate" type memory cell including a floating gate transistor, or may be a "charge trap" type memory cell including a charge trap transistor.

In some implementations, each memory cell 606 is a Single-Level Cell (SLC) having two possible storage states (levels) and thus capable of storing one bit of data. For example, a first storage state "0" may correspond to a first range of threshold voltage, and a second storage state "1" may correspond to a second range of threshold voltage. In some examples, each memory cell 606 is an xLC capable of storing more than one bit of data in more than four storage states (levels). For example, xLC can store two bits in each cell (e.g., Multi-Level Cell, MLC), store three bits in each cell (e.g., Triple-Level Cell, TLC), or store four bits in each cell (e.g., Quad-Level Cell, QLC). Each xLC may be programmed to assume a range of possible nominal storage values (e.g., 2N segments of N-bit data, e.g., Gray code). In an example, an MLC may be programmed from an erase state to assuming one of three possible program levels through writing one of the three possible nominal storage values into the cell. A fourth nominal storage value may be used for the erased state.

As shown in FIG. 12, each NAND memory string 608 may also include a Source Select Gate (SSG) transistor 610 at its source end and a Drain Select Gate (DSG) transistor 612 at its drain end. SSG transistor 610 and DSG transistor 612 may be configured to activate selected NAND memory string 608 (columns of the array) during read operation and program operation. In some implementations, sources of NAND memory strings 608 in the same block 604 are coupled through the same source line (SL) 614 (e.g., a common SL). In other words, according to some implementations, all NAND memory strings 608 in a same block 604 have an Array Common Source (ACS). According to some implementations, the drain of each NAND memory string 608 is coupled to a corresponding bit line 616 from which data can be read or written via an output bus (not shown). In some implementations, each NAND memory string 608 is configured to be selected or deselected through applying a select voltage or a deselect voltage to the gate of the corresponding DSG transistor 612 via one or more DSG lines 613 and/or to apply a select voltage or a deselect voltage to the gate of the corresponding SSG transistor 610 via one or more SSG lines 615.

Figure 13:
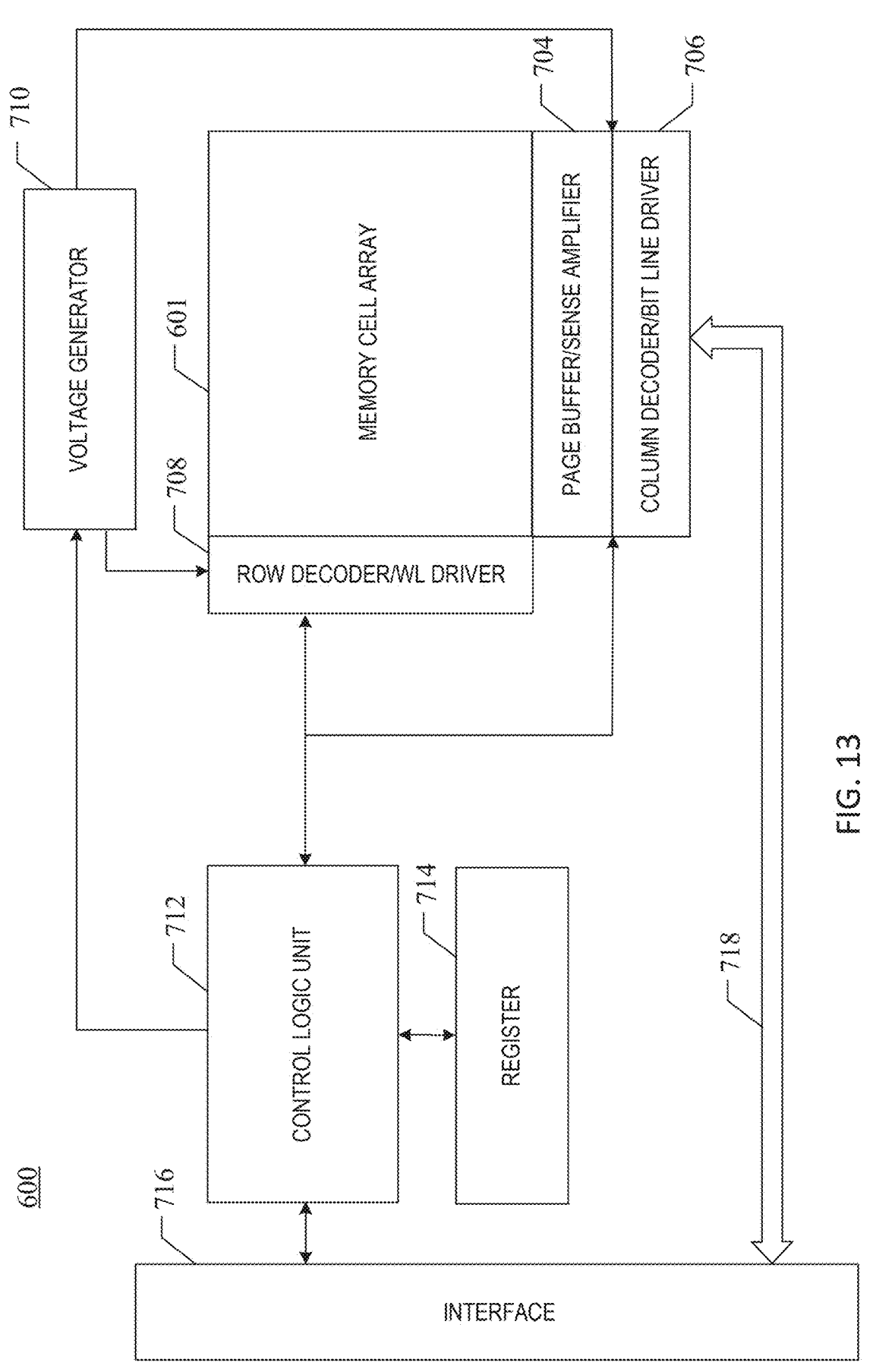
FIG. 13 is a module schematic diagram 2 of a memory device according to some examples.

As shown in FIG. 12, NAND memory strings 608 may be organized into multiple blocks 604, each of which may have a common source line 614 e.g., coupled to an ACS. In some implementations, each block 604 is the basic data unit for an erase operation, e.g., all memory cells 606 on a same block 604 are erased simultaneously. To erase the memory cell 606 in the selected block 604, the source line 614 coupled to the selected block 604 and to the unselected blocks 604 in the same plane as the selected block 604 may be biased with an erase voltage (Vers) (e.g., a high positive bias voltage (e.g., 20V or higher)). Memory cells 606 of adjacent NAND memory strings 608 may be coupled through a Word Line (WL) 618 that selects which row of memory cells 406 is affected by read operation and program operation. The peripheral circuit 602 may be coupled to the memory cell array 601 through Bit Line (BL) 616, word line 618, source line 614, SSG line 615, and DSG line 613. The peripheral circuit 602 may include any suitable analog, digital, and mixed-signal circuitry for facilitating operation of the memory cell array 601 through applying a voltage signal and/or a current signal to and sensing voltage signal and/or current signal from each target memory cell 606 via bit line 616, word line 618, source line 614, SSG line 615, and DSG line 613. The peripheral circuit 602 may include various types of peripheral circuits formed with metal-oxide-semiconductor (MOS) technology. For example, FIG. 13 illustrates some example peripheral circuits, which includes page buffer/sense amplifier 704, column decoder/bit line driver 706, row decoder/word line driver 708, voltage generator 710, control logic unit 712, register 714, interface (I/F) 716 and data bus 718. Additional peripheral circuits not shown in FIG. 13 may also be included.

The page buffer/sense amplifier 704 may be configured to read data from and program (write) data to the memory cell array 601 according to control signals from the control logic unit 712. In an example, page buffer/sense amplifier 704 may perform a program verify operation to ensure that data has been correctly programmed into memory cell 606 coupled to selected word line 618. In another example, page buffer/sense amplifier 704 may also, in the read operation, sense a low power signal from bit line 616 representing a data bit stored in memory cell 606 and amplify a small voltage swing to a recognizable logic level. As described in detailed below and consistent with the scope of the present disclosure, in a program operation, the page buffer/sense amplifier 704 may include a storage module (e.g., latch, cache, register, etc.), which is to temporarily store a segment of N-bit data (e.g., in the form of Gray code) received from the data bus 718 and provide the segment of N-bit data to the corresponding target memory cell 606 through the corresponding bit line 616 in each program pass of a multi-pass program operation using a $2^N$-$2^N$ scheme.

Column decoder/bit line driver 706 may be configured to be controlled by control logic unit 712 and to select one or more NAND memory strings 608 through applying a bit line voltage generated from voltage generator 710. The row decoder/word line driver 708 may be configured to be controlled by control logic unit 712 and select/deselect block 604 of memory cell array 601 and select/deselect word line 618 of block 604. Row decoder/word line driver 708 may also be configured to drive word line 618 with a word line voltage generated from voltage generator 710. In some implementations, the row decoder/word line driver 708 may also select/deselect and drive the SSG line 615 and the DSG line 613. The voltage generator 710 may be configured to be controlled by the control logic unit 712, and generate word line voltage (e.g., read voltage, program voltage, pass voltage, local voltage, verify voltage, etc.), bit line voltage and source line voltage to be supplied to the memory cell array 601.

Control logic unit 712 may be coupled to each of the peripheral circuits described above and configured to control operations of each of the peripheral circuits. Register 714 may be coupled to the control logic unit 712 and include state register, command register and address register for storing state information, command operation code (OP) and command address for controlling operations of each of the peripheral circuits. Interface 716 may be coupled to control logic unit 712 and act as a control buffer to buffer control commands received from a host (e.g., the host 1100B in FIG. 9) and forward them to the control logic unit 712, and to buffer state information received from the control logic unit 712 and forward it to the host. Interface 716 may also be coupled to column decoder/bit line driver 706 via data bus 718 and act as a data input/output (I/O) interface and data buffer to buffer and forward data to/from memory cell array 601.

Examples of the present disclosure provide a controller, a test system, a memory system, a data processing method and a device, which use differential coding technology to compress the timing data collected by the data collector. The differential coding technology encodes and compresses based on the difference between the timing data, and only stores the difference information between the reference data, thereby greatly reducing the volume of the data. The differential coding technology can effectively reduce the redundancy between data and improve the efficiency of storage and transmission. During the transmission process, the bandwidth occupation is reduced, the data details are not lost, and the original appearance of the data can be retained, so that the original data can be directly used in data analysis to obtain all the information of the object, and dynamic matching may be performed according to the data characteristics to improve efficiency. Thus, not only the problems of data redundancy and storage can be solved, but also the accuracy of the analysis results can be ensured, thereby providing strong support for product performance evaluation and optimization.

An example of the present application also provides a computer-readable storage medium, which includes instructions. When the instructions are executed on the memory system described in the above examples, the memory system executes the data processing method described in the above examples (e.g., the electronic device, test system, memory system, controller and data processing method shown in FIG. 2, FIG. 3, FIG. 4, FIG. 5, FIG. 6, FIG. 7, FIG. 8, FIG. 9, FIG. 10, FIG. 11, FIG. 12 and FIG. 13).

The above is only some implementations of the present application, but the claimed scope of the present application is not limited thereto, and changes or substitutions within the technical scope disclosed in the present application that may be easily conceived by those skilled in the art shall fall within the claimed scope of the present application. Therefore, the claimed scope of the present application should be determined by the claimed scope of the claims.

What is claimed is:

1. A controller configured to:

receive data to be compressed, the data to be compressed comprising multiple full data; and output compressed data based on the data to be compressed, wherein the compressed data comprises at least first compressed data and second compressed data, wherein the first compressed data is obtained based on first data to be compressed in the data to be compressed, wherein the first compressed data comprises a first base value, a first incremental value of representative of a difference between a second value of the full data and the base value, and a second incremental value representative of a difference between a third value of the full data and the second value of the full data, wherein the increment value in the first compressed data falls within a preset range of increment values, wherein the second compressed data is obtained based on second data to be compressed in the data to be compressed, wherein the second compressed data comprises a second base value and an incremental value of at least one of full data in the second data to be compressed relative to the second base value, wherein the increment value in the second compressed data falls within the preset range of increment values, and wherein the first base value is different from the second base value.

2. The controller of claim 1, wherein the first base value is one of full data in the first data to be compressed, and the second base value is one of full data in the second data to be compressed.

3. The controller of claim 1, wherein the first base value is an average of a maximum and minimum of all full data in the first data to be compressed, and the second base value is an average of a maximum and minimum of all full data in the second data to be compressed.

4. The controller of claim 1, wherein a difference between the first base value and the second base value does not fall within the preset range of increment values.

5. The controller of claim 1, wherein the first compressed data further comprises a first identifier, and the first identifier is to distinguish the first base value with the incremental value relative to the first base value in the first compressed data; and the second compressed data further comprises a second identifier, and the second identifier is to distinguish the second base value with the incremental value relative to the second base value in the second compressed data.

6. The controller of claim 5, wherein the first identifier is further to indicate a number of incremental values in the first compressed data, and the second identifier is further to indicate a number of incremental values in the second compressed data.

7. The controller of claim 1, wherein:

the first compressed data further comprises a third identifier and a fourth identifier, the third identifier is to indicate a storage location of the first base value, and the fourth identifier is to indicate a storage location of the incremental value in the first compressed data; and the second compressed data further comprises a fifth identifier and a sixth identifier, the fifth identifier is to indicate a storage location of the second base value, and the sixth identifier is to indicate a storage location of the incremental value in the second compressed data.

8. The controller of claim 1, wherein the output the compressed data based on the data to be compressed comprises:

obtaining groups of compressed data based on the data to be compressed, wherein different groups of the compressed data in the groups of compressed data are obtained based on different preset ranges of increment values; and outputting target compressed data according to the groups of compressed data, wherein the target compressed data is the compressed data occupying the smallest storage space among the compressed data.

9. A memory system, comprising:

a memory; and a controller coupled with the memory and configured to:

receive data to be compressed, the data to be compressed comprising multiple full data;

output compressed data based on the data to be compressed, wherein the compressed data comprises at least first compressed data and second compressed data, wherein the first compressed data is obtained based on first data to be compressed in the data to be compressed, wherein the first compressed data comprises a first base value, a first incremental value representative of a difference between a second value of the full data and the base value, and a second incremental value representative of a difference between a third value of the full data and the second value of the full data, wherein the increment value in the first compressed data falls within a preset range of increment values, wherein the second compressed data is obtained based on second data to be compressed in the data to be compressed, wherein the second compressed data comprises a second base value and an incremental value of at least one of full data in the second data to be compressed relative to the second base value, wherein the increment value in the second compressed data falls within the preset range of increment values, and wherein the first base value is different from the second base value; and store the compressed data into the memory.

10. The memory system of claim 9, wherein the first base value is one of full data in the first data to be compressed, and the second base value is one of full data in the second data to be compressed.

11. The memory system of claim 9, wherein the first base value is an average of a maximum and minimum of all full data in the first data to be compressed, and the second base value is an average of a maximum and minimum of all full data in the second data to be compressed.

12. The controller of claim 9, wherein a difference between the first base value and the second base value does not fall within the preset range of increment values.

13. A data processing method comprising:

receiving data to be compressed, the data to be compressed comprising multiple full data; and outputting compressed data based on the data to be compressed, wherein the compressed data comprises at least first compressed data and second compressed data, wherein the first compressed data is obtained based on first data to be compressed in the data to be compressed, wherein the first compressed data comprises a first base value and an incremental value of at least one of full data in the first data to be compressed relative to the first base value, a first and incremental value representative of a difference between a second value of the full data and the base value, and a second incremental value representative of a difference between a third value of the full data and the second value of the full data, wherein the increment value in the first compressed data falls within a preset range of increment values, wherein the second compressed data is obtained based on second data to be compressed in the data to be compressed, wherein the second compressed data comprises a second base value and an incremental value of at least one of full data in the second data to be compressed relative to the second base value, wherein the increment value in the second compressed data falls within the preset range of increment values, and wherein the first base value is different from the second base value.

14. The data processing method of claim 13, wherein the first base value is one of full data in the first data to be compressed, and the second base value is one of full data in the second data to be compressed.

15. The data processing method of claim 13, wherein the first base value is an average of the maximum and minimum of all full data in the first data to be compressed, and the second base value is an average of the maximum and minimum of all full data in the second data to be compressed.

16. The data processing method of claim 13, wherein a difference between the first base value and the second base value does not fall within the preset range of increment values.

17. The data processing method of claim 13, wherein the first compressed data further comprises a first identifier, and the first identifier is to distinguish the first base value with the incremental value relative to the first base value in the first compressed data; and the second compressed data further comprises a second identifier, and the second identifier is to distinguish the second base value with the incremental value relative to the second base value in the second compressed data.

18. The data processing method of claim 17, wherein the first identifier is further to indicate a number of incremental values in the first compressed data, and the second identifier is further to indicate a number of incremental values in the second compressed data.

19. The data processing method of claim 13, wherein the first compressed data further comprises a third identifier and a fourth identifier, the third identifier is to indicate a storage location of the first base value, and the fourth identifier is to indicate a storage location of the incremental value in the first compressed data; and the second compressed data further comprises a fifth identifier and a sixth identifier, the fifth identifier is to indicate a storage location of the second base value, and the sixth identifier is to indicate a storage location of the incremental value in the second compressed data.

20. The data processing method of claim 13, wherein the outputting compressed data based on the data to be compressed comprises:

obtaining groups of compressed data based on the data to be compressed, wherein different groups of the compressed data in the groups of compressed data are obtained based on different preset ranges of increment values; and outputting target compressed data according to the groups of compressed data, wherein the target compressed data is the compressed data occupying the smallest storage space among the compressed data.

* * * * *